(12) United States Patent
Luft et al.

(10) Patent No.: US 7,573,814 B1
(45) Date of Patent: Aug. 11, 2009

(54) METHOD AND APPARATUS FOR PROTECTION OF AN OPTICAL NETWORK

(75) Inventors: Siegfried Luft, Vancouver (CA); Thomas Meehan, New York, NY (US); Gerald W. Neufeld, Los Altos, CA (US); Simon Williams, San Jose, CA (US)

(73) Assignee: Redback Networks Inc., San Jose, CA (US)

( * ) Notice: Subject to any disclaimer, the term of this patent is extended or adjusted under 35 U.S.C. 154(b) by 1379 days.

(21) Appl. No.: 10/285,937

(22) Filed: Oct. 31, 2002

Related U.S. Application Data

(63) Continuation-in-part of application No. 09/999,542, filed on Oct. 31, 2001, now abandoned.

(51) Int. Cl.
*H04L 12/437* (2006.01)
(52) U.S. Cl. ............. 370/223; 370/242; 370/249
(58) Field of Classification Search ......... 370/216–220, 370/221–228, 242–245, 249; 709/220–225
See application file for complete search history.

(56) References Cited

U.S. PATENT DOCUMENTS

| | | | | |
|---|---|---|---|---|
| 6,654,923 | B1 * | 11/2003 | Grenier et al. | 714/752 |
| 6,795,394 | B1 * | 9/2004 | Swinkels et al. | 370/222 |
| 6,848,006 | B1 | 1/2005 | Hermann | |
| 6,934,248 | B1 * | 8/2005 | DeBoer et al. | 370/217 |
| 7,016,300 | B2 * | 3/2006 | Luft et al. | 370/221 |
| 7,170,852 | B1 * | 1/2007 | Adler | 370/223 |
| 2003/0009582 | A1 | 1/2003 | Qiao et al. | |
| 2003/0021222 | A1 | 1/2003 | Boer et al. | |
| 2004/0105383 | A1 | 6/2004 | Agrawal et al. | |
| 2005/0122899 | A1 | 6/2005 | DeBoer et al. | |

OTHER PUBLICATIONS

"Telecommunications: Glossary of Telecommunication Terms." General Services Administration Information Technology Service, Aug. 7, 1996, 4 pages.
"ATIS Telecom Glossary 2000." ATIS Committee T1A1 Performance and Signal Processing, Feb. 28, 2001, 3 pages.
ITU-R Recommendation G.803, "Series G: Transmission Systems and Media, Digital Systems and Networks", Architecture of transport networks based on the synchronous digital hierarchy (SDH), Mar. 2000, 59 pages.
Office Action mailed Jul. 22, 2005 for U.S. Appl. No. 09/999,542, 11 pages.

* cited by examiner

*Primary Examiner*—Wing F Chan
*Assistant Examiner*—Duc T Duong
(74) *Attorney, Agent, or Firm*—Blakely, Sokoloff, Taylor & Zafman LLP

(57) ABSTRACT

A method and apparatus for mesh based protection of an optical network is described. A method comprises protecting a first set of one or more optical sub-channels with automatic protection switching, utilizing a second and third set of one or more optical sub-channels to transmit traffic in accordance with a mesh process to transmit traffic, and transmitting traffic in the third set of optical sub-channels, which would have been transmitted in the second set of optical sub-channels, in accordance with routes determined by the mesh process in response to an alarm indicating a failure affecting the second set of optical sub-channels.

40 Claims, 5 Drawing Sheets

METHOD AND APPARATUS FOR PROTECTION OF AN OPTICAL NETWORK

CROSS-REFERENCE TO RELATED APPLICATIONS

The present patent application is a Continuation-in-Part of prior application Ser. No. 09/999,542, filed Oct. 31, 2001 now abandoned entitled, Method And Apparatus For Protection Of An Optical Network, which is also incorporated herein by reference.

BACKGROUND OF THE INVENTION

1. Field of the Invention

The invention relates to the field of communication. More specifically, the invention relates to communication networks.

2. Background of the Invention

Optical networks were developed as a reliable means to carry voice traffic. Optical networks have evolved to also carry data traffic. The transmission standard for optical networks is synchronous optical network (SONET). SONET provides for automatic protection switching (APS) to protect traffic traveling over optical networks.

APS can be in the form of a ring switch (loopback), span switch, or path switch. SONET APS is typically done on a per SONET system basis. A ring switch occurs in a bi-directional line switched ring (BLSR). When a failure occurs in the BLSR, the affected traffic is ring switched to flow around the BLSR in a direction opposite of the original direction of the affected traffic around the failed span. A span switch can occur in an N-fiber BLSR (N being greater than 2) or on a linear connection, which is typically used to connect rings or in linear SONET systems. A span switch switches traffic from the failed fiber to another fiber that flows in the same direction. Span switching can be implemented as 1:1, N:M, or 1:N. Path switching can occur in a uni-directional path switched ring (UPSR). A path switch occurs when a receiving node detects a failure on the working path and switches to the protection path. The protection path typically flows in the opposite direction around the ring and is typically done on a unidirectional basis.

Despite the reliability of these methods of protection for optical networks, SONET APS is inflexible. The migration of optical networks from carrying voice to data has brought about a greater demand for higher transfer rates as well as a demand for diverse services. These services include multiple levels of quality of service (QoS). Unfortunately, multiple levels of QoS cannot be provided with SONET.

BRIEF SUMMARY OF THE INVENTION

A method and apparatus for the protection of an optical network is described. According to one aspect of the invention, a method provides for protecting a first set of one or more optical sub-channels with automatic protection switching and utilizing a second and third set of one or more optical sub-channels to transmit traffic in accordance with a mesh process to transmit traffic. The method additionally provides for transmitting traffic in the third set of optical sub-channels, which would have been transmitted in the second set of optical sub-channels, in accordance with routes determined by the mesh process in response to an alarm indicating a failure affecting the second set of optical sub-channels.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE DRAWINGS

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Figure 1:
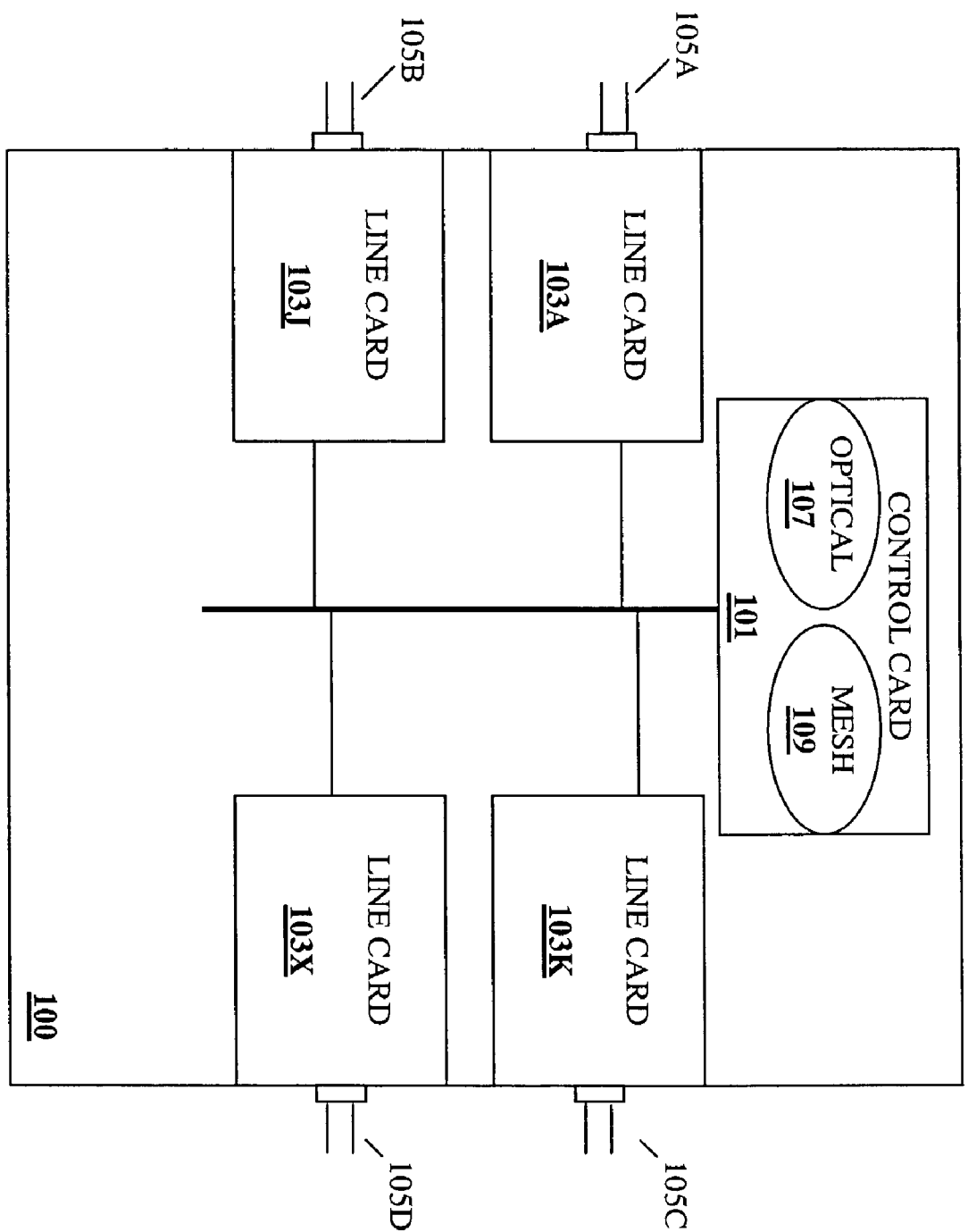
FIG. 1 is a diagram of a network element according to one embodiment of the invention.

FIG. 1 is a diagram of a network element according to one embodiment of the invention. A network element 100 illustrated in FIG. 1 includes a control card 101 coupled with line cards 103A-103X. The line cards 103A, 103J, 103K, and 103X are respectively coupled with fibers 105A, 105B, 105C, and 105D. Each of the fibers 105A-105D carries traffic. The traffic can be voice, data, etc. Each of the line cards 103A-103X receives traffic and transmits traffic over the fibers 105A-105D. The line cards 103A-103X are coupled with a control card 101. The control card 101 hosts an optical network protocol process 107 (e.g., SONET, SDH, etc.) and a mesh protection process 109. The optical network protocol process 107 processes signals in accordance with an optical network protocol. The mesh protection process 109 calculates routes for traffic transmitted from the network element 100.

While an exemplary architecture of a network element is illustrated, an alternative embodiment may use other architectures. For example, FIG. 1 shows a single bus interconnecting the line cards and the control card. Alternative embodiments may use an alternative technique (e.g., a full mesh, multiple point to point links, combinations of the above, etc.).

Figure 2:
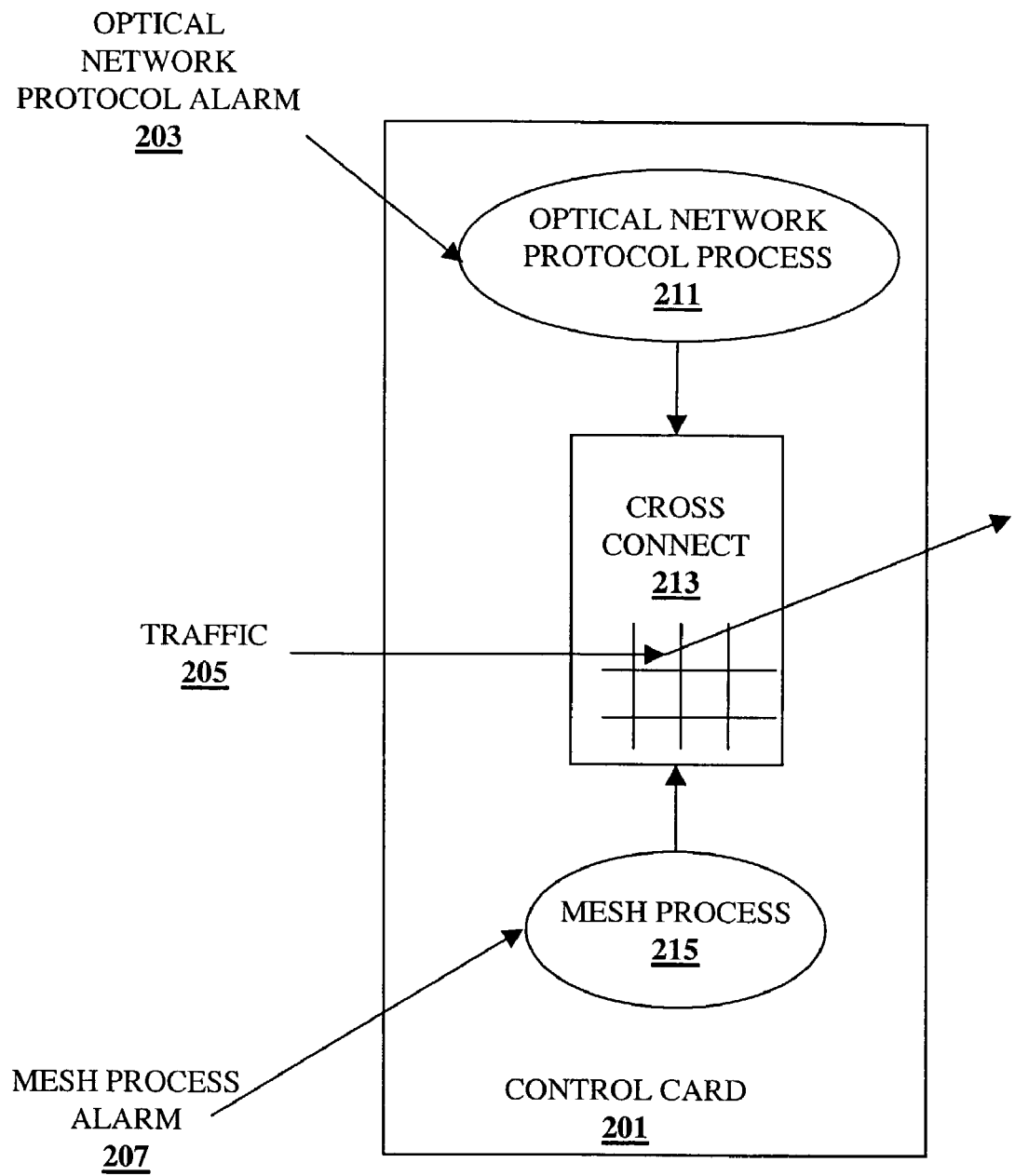
FIG. 2 is a diagram of a control card according to one embodiment of the invention.

FIG. 2 is a diagram of a control card according to one embodiment of the invention. A control card 201 hosts an optical network protocol process 211 and a mesh protection process 215. The control card 201 also hosts a cross connect 201 (e.g., an optical cross connect, digital cross connect, etc.). The cross connect 201 includes forwarding information for traffic that traverses the control card 201. A set of traffic 205 received from a line card coupled with the control card 201 traverses the cross connect 213 on the control card 201. The control card 201 transmits the set of traffic 205 to the appropriate line card as indicated by the cross connect 213.

Although FIG. 2 illustrates a single cross connect, an alternative architecture utilizes multiple distributed cross connects.

The traffic received by that traverses the cross connect 213 travels along channels configured by an administrator or as indicated in a configuration file. Configuration information identifies ranges of channels (e.g. STS-1s) which can be grouped together to form larger channels. For example, one range of channels can be configured as a working channel and a second range of channels is reserved as a protection channel. Another range of channels can be configured as a non-preemptable unprotected traffic (NUT) channel. The optical network protocol process 211 maintains and modifies (e.g., protection switch) entries in the cross connect 213 that correspond to STS-1s that are configured as part of the working or protecting channel. The mesh process 215 maintains and/or modifies entries in the cross connect 213 that correspond to STS-1s configured as part of a NUT channel.

The cross connect 213 is modified by the optical network protocol process 211 and/or the mesh process 215 in response to an alarm. If the optical network protocol process 211 receives an optical network protocol alarm 203 ("optical alarm"), then the optical network protocol process 211 modifies the cross connect 201 in accordance with the optical alarm 203. For example, if a network element that hosts the control card 201 is in a bi-directional line switched ring (BLSR) then the optical network protocol process 211 will modify the cross connect 201 to cause a ring switch or span switch as provided by SONET/SDH in response to receiving the optical alarm 203. If the mesh process 215 receives a mesh alarm 207, then the mesh process 215 recalculates routesin accordance with the mesh alarm 207. After recalculating routes, the mesh process 215 modifies the cross connect 213 in accordance with the recalculated routes.

Sharing a cross connect between a mesh process and an optical network protocol process enables protection of optical traffic (e.g., SONET traffic with APS) and protection of typically unprotected traffic (e.g., NUT traffic). A network element that provides mesh protection for typically unprotected traffic along with SONET APS enables improved utilization of bandwidth for greater revenue generation since customers can be offered protected traffic.

Figure 3:
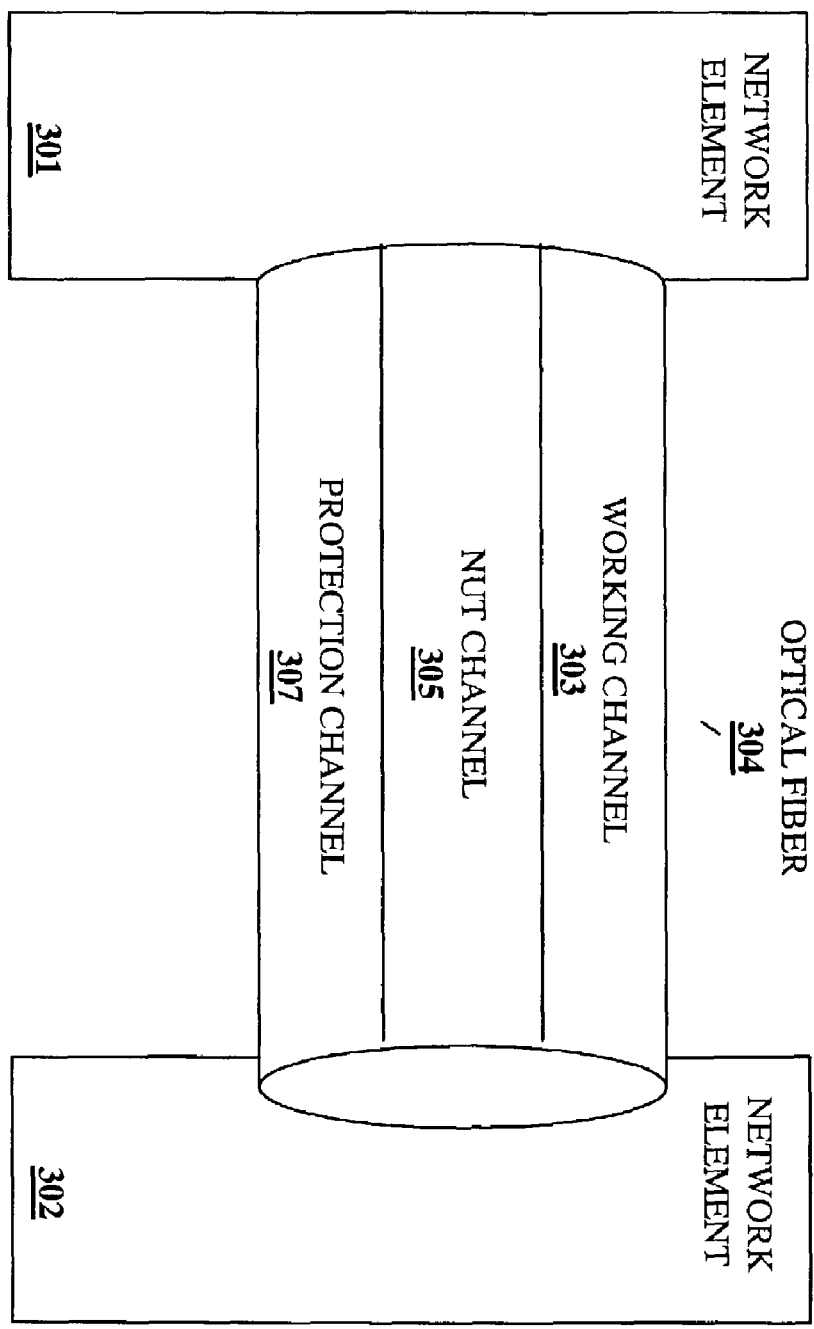
FIG. 3 is a diagram illustrating channel allocation according to one embodiment of the invention.

FIG. 3 is a diagram illustrating channel allocation according to one embodiment of the invention. Network elements 301 and 302 are coupled with an optical fiber 304. In FIG. 3, the optical fiber 304 has been logically divided into three channels 303, 305, and 307 in accordance with configuration information defined by an administrator. The configuration information groups sub-channels (e.g., timeslots, wavelengths, etc.) into administrator defined channels and specifies a protection scheme for the configured channels. For example, the channel 303 in FIG. 3 has been configured as a working channel. A protection channel 307 protects the working channel 303. The channel 305 in FIG. 3 has been configured as a NUT channel. A SONET process, for example, manages the working channel 303 and the protection channel 307. A mesh protection process manages the sub-channels allocated to the NUT channel 305. An optical network protocol process in the network element 301 (assuming the optical fiber 304 is an East flowing span) will affect the sub-channels corresponding to the working channel and/or the protection channel 307 when the optical network protocol process modifies the cross connect of the network element 301. A mesh protection process in the network element 301 (again assuming the optical fiber 304 is an East flowing span) will affect the sub-channels corresponding to the NUT channel 305 when the mesh protection process modifies the cross connect of the network element 301.

Figure 4:
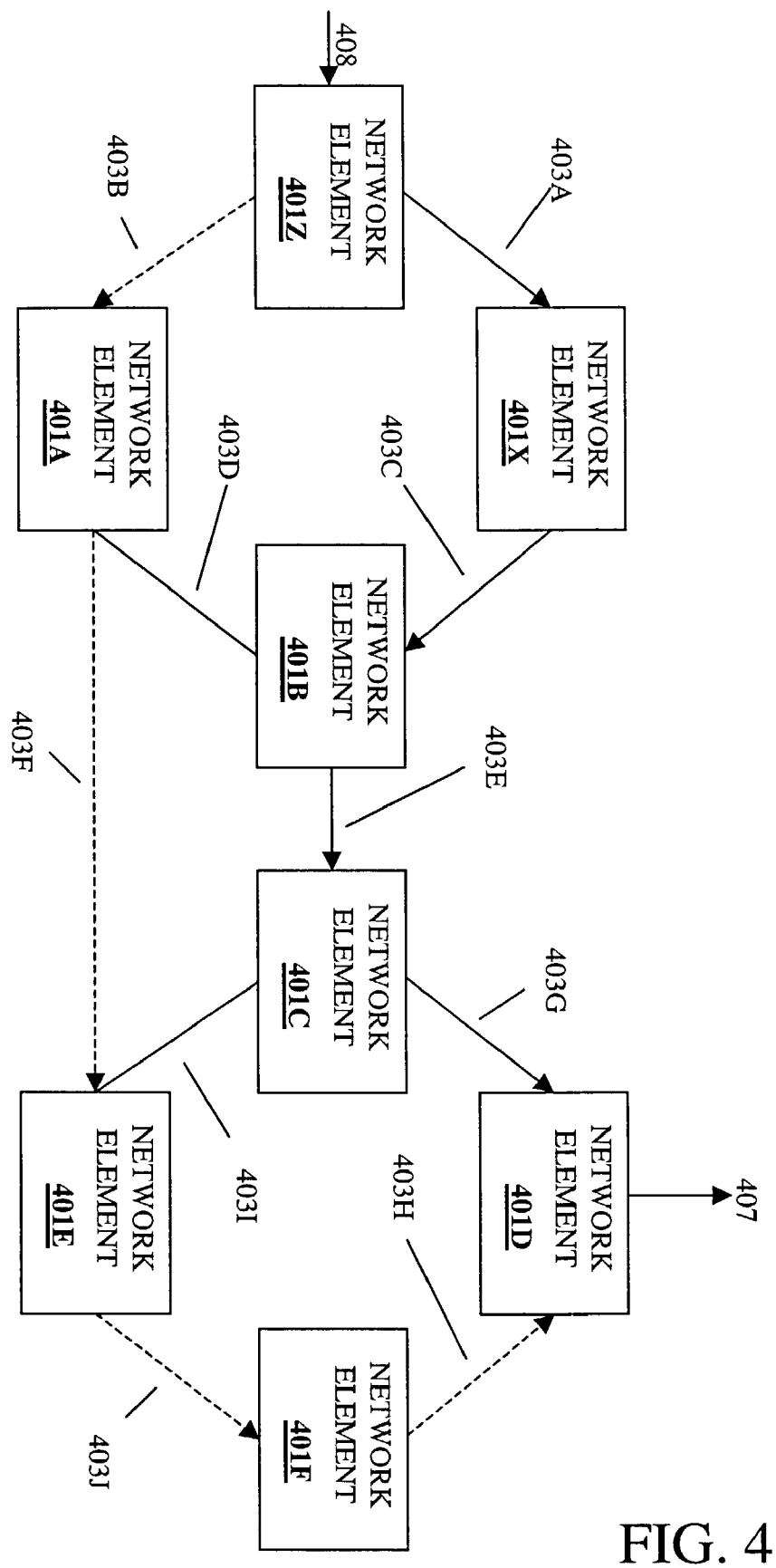
FIG. 4 is a diagram illustrating an exemplary network according to one embodiment of the invention.
Figure 5:
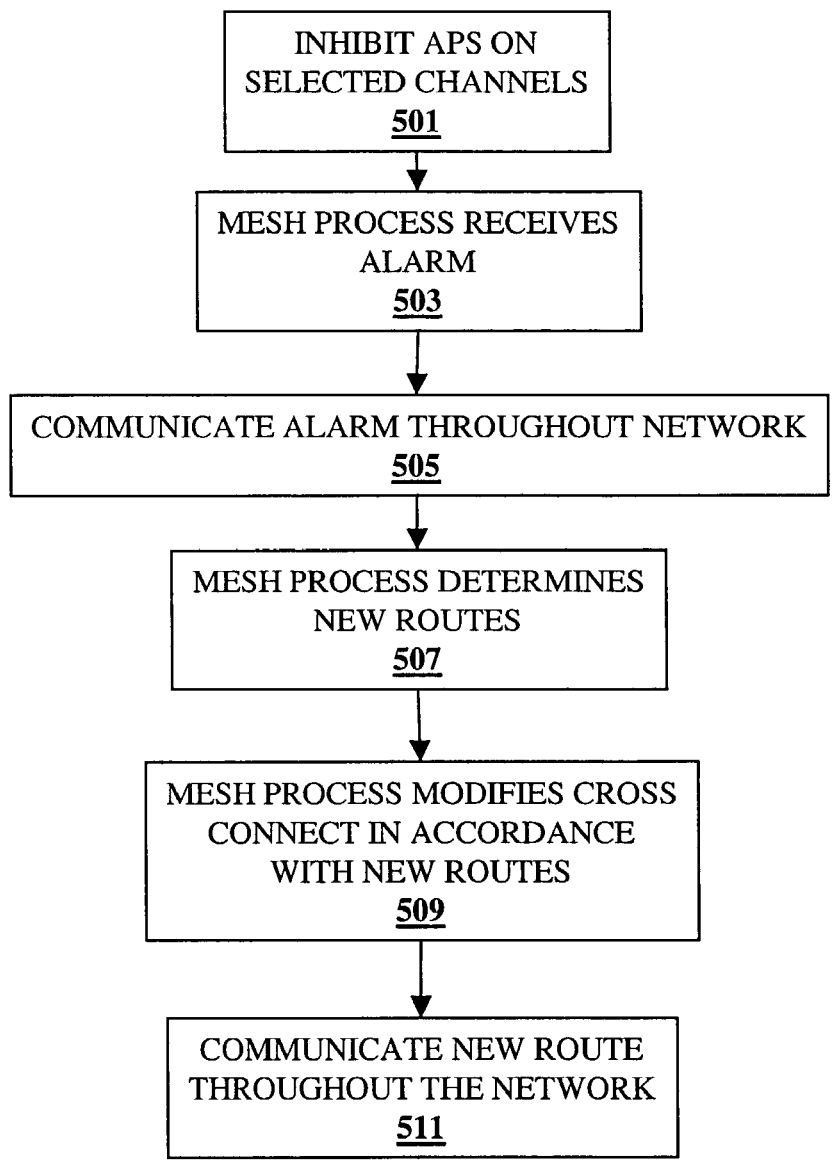
FIG. 5 is a flow chart for mesh protection of an optical network according to one embodiment of the invention.

FIG. 4 is a diagram illustrating an exemplary network according to one embodiment of the invention. FIG. 5 is a flow chart for mesh protection of an optical network according to one embodiment of the invention. FIG. 4 will be described with reference to FIG. 5. In FIG. 4, the network element 401Z, the network element 401X, a network element 401B, and a network element 401A are connected in a ring topology. FIG. 4 also illustrates network elements 401C-401F coupled in a ring topology. The connectivity of the two rings are described in the two tables below.

TABLE 1

Connectivity in Ring One

| Network Element | Network Element | Link |
|---|---|---|
| 401Z | 401X | 403A |
| 401Z | 401A | 403B |
| 401A | 401B | 403D |
| 401X | 401B | 403C |

TABLE 2

Connectivity in Ring Two

| Network Element | Network Element | Link |
|---|---|---|
| 401C | 401D | 403G |
| 401D | 401F | 403H |
| 401F | 401E | 403J |
| 401E | 401C | 403I |

The two rings are connected with links 403E and 403F. The link 403E couples the network element 401B to the network element 401C. The link 403F couples the network element 401A with the network element 401E. The ring topology illustrated in FIG. 5 is exemplary only and not meant to be limiting upon the invention. The network elements could be connected linearly, mesh, etc.

In FIG. 5 at block 501, automatic protection switching is inhibited on a set of selected channels. Returning to FIG. 4, each of the links 403A-403J include a channel with automatic protection switching inhibited, as with the NUT channel 305 of FIG. 3. For this illustration, traffic received over a NUT channel on an optical fiber 408 at the network element 401Z is destined for the network element 401D. The traffic in this illustration traverses the following path while there is not a failure: link 403A→network element 401X→link 403C→network element 401B→link 403E→network element 401C→link 403G→network element 401D. At the network element 401D, the traffic exits the second ring via a fiber 407.

In this illustration, a failure occurs in the previously described path. The network elements adjacent to the failure will communicate the failure throughout the network with both an optical network protocol alarm and a mesh alarm. In an alternative embodiment of the invention, a single alarm is transmitted and received by an optical network protocol process and a mesh protection process. In one embodiment of the invention, the failure is communicated with in-band signaling. For example, the network elements may communicate the failure with K1 and K2 bytes. In another embodiment of the invention, the failure is communicated over an alternate network (e.g., separate Ethernet). In another embodiment of the invention, the failure is communicated out-of-band. For example, failure information is carried in synchronous transport signals (STSs) transmitted in the working channel and/or the NUT channel.

Returning to FIG. 5, at block 503, a mesh protection process receives an alarm indicating a failure. At block 505, the alarm is communicated throughout the network. At block 507, the mesh protection process 109 recalculates routes through the network in light of the failure. In one embodiment of the invention, alternate routes are predetermined. In another embodiment of the invention, new routes are calculated in response to receiving the alarm.

At block 509, the mesh protection process modifies the cross connect in accordance with the newly calculated routes. At block 511, the newly calculated routes are communicated throughout the network.

Returning to FIG. 4, the network element 401Z receives the alarm, communicates the alarm, and determines the new route for the traffic. For this illustration, the new path is as follows: link 403B→network element 401A→link 403F→network element 401E→link 403J→network element 401F→link 403H→network element 401D. The network element 401Z modifies its cross connect in accordance with this new path. The network element 401Z then communicates this new path to at least the network elements 401A, 401E, and 401F. In another embodiment of the invention the network element broadcasts the new path throughout the network. In another embodiment of the invention, each network element independently determines new routes in response to broadcast alarms.

Combining mesh protection with SONET protection enables service providers and carriers to provide a high level of protection in conjunction with mesh-based quality of service (QoS) for provisioning channels and protecting channels. In addition, layer one mesh protection provides protection to traffic regardless of the traffic type. For example, layer one mesh protection can protect voice data, asynchronous transfer mode (ATM) traffic, IP traffic, etc., whereas layer two or layer three protection is limited to layer two or layer three traffic. Moreover, layer one mesh protection is faster than layer two protection or layer three protection. Also, layer one mesh protection enables flexibility of protection schemes. For example, the mesh protection can be back-up span diverse, node diverse, conduit diverse, etc. With the embodiments of the present invention, service providers and carriers can build out their optical networks. Moreover, service providers and carriers can take advantage of the speed and reliability of optical networks while supporting the flexibility and diversity of a mesh architecture.

While the invention has been described in terms of several embodiments, those skilled in the art will recognize that the invention is not limited to the embodiments described.

The method and apparatus of the invention can be practiced with modification and alteration within the spirit and scope of the appended claims. The description is thus to be regarded as illustrative instead of limiting on the invention.

What is claimed is:

1. A computer implemented method comprising:
   protecting a first channel with automatic protection switching, wherein the first channel has been provisioned from a plurality of optical sub-channels;
   inhibiting automatic protection switching on a second and third channel, which have been provisioned from the plurality of optical sub-channels, wherein the second and third channels are provisioned as a first and second non-preemptable unprotected (NUT) traffic channels respectively;
   transmitting traffic over a first path through an optical network, wherein the first path includes the second channel;
   detecting a failure in the first path;
   determining with a mesh protection process a second path through the optical network as an alternative to the first path, the second path including the third channel; and
   transmitting traffic in the third channel.

2. The computer implemented method of claim 1 wherein the mesh protection process implements quality of service in the optical network.

3. The computer implemented method of claim 1 wherein the second path is calculated by the mesh protection process in response to detecting the failure in the first path.

4. The computer implemented method of claim 1 wherein the second path is predetermined.

5. The computer implemented method of claim 1 wherein the traffic is data traffic.

6. The computer implemented method of claim 1 wherein the traffic is voice traffic.

7. The computer implemented method of claim 1 further comprising communicating the failure throughout the optical network in-band.

8. The computer implemented method of claim 1 further comprising communicating the failure throughout the optical network out-of-band.

9. The computer implemented method of claim 1 further comprising communicating the failure throughout the optical network via a separate network.

10. A computer implemented method comprising:
    protecting a first set of one or more optical sub-channels with automatic protection switching;
    utilizing a second and third set of one or more optical sub-channels to transmit traffic in accordance with a mesh process to transmit traffic, wherein the second and third set of optical sub-channels are provisioned as a first and second non-preemptable unprotected (NUT) traffic channels respectively; and
    transmitting traffic in the third set of optical sub-channels, which would have been transmitted in the second set of optical sub-channels, in accordance with routes determined by the mesh process in response to an alarm indicating a failure affecting the second set of optical sub-channels.

11. The computer implemented method of claim 10 wherein the mesh protection process implements quality of service in the optical network.

12. The computer implemented method of claim 10 wherein the mesh process statically or dynamically determines the routes.

13. The computer implemented method of claim 10 further comprising communicating the alarm throughout the optical network in-band.

14. The computer implemented method of claim 10 further comprising communicating the alarm throughout the optical network out-of-band.

15. The computer implemented method of claim 10 further comprising communicating the alarm throughout the optical network via a separate network.

16. A system comprising:
    a first network element transmitting a first traffic flow in a first set of optical sub-channels and a second traffic flow in a second set of optical sub-channels, wherein automatic protection switching protects the first set of optical sub-channels and a mesh protection process protects the second set of optical sub-channels, wherein the second set of optical sub-channels is a first non-preemptable unprotected traffic channel;
    a second network element receiving the second traffic flow while there is no failure affecting the second set of optical sub-channels; and
    a third network element receiving the second traffic flow in a third set of optical sub-channels while a failure affects the second set of optical sub-channels, wherein the third set of optical sub channels is a first non-preemptable unprotected traffic channel, and wherein the mesh protection process of the first network element determines a new set of routes in response to the failure affecting the second set of optical sub-channels and switches the second traffic flow to the third set of optical sub-channels.

17. The system of claim 16 wherein the traffic is data traffic.

18. The system of claim 16 wherein the traffic is voice traffic.

19. The system of claim 16 wherein the mesh protection process determines the new set of routes dynamically or statically.

20. The system of claim 16 further comprising communicating the failure throughout the optical network in-band.

21. The system of claim 16 further comprising further comprising communicating the failure throughout the optical network out-of-band.

22. The system of claim 16 further comprising the first network element, the second network element, and the third network element being coupled with a separate network media, the separate network media to communicate the failure.

23. An apparatus comprising:
a set of one or more line cards to receive and to transmit traffic in a plurality of sub-channels in accordance with a cross connect; and
a control card coupled with the set of line cards, the control card having a set of instructions stored thereon to cause the control card to,
maintain a cross connect with an optical network protocol process that utilizes automatic protection switching (APS) and a mesh protection process,
the optical network protocol process to perform APS on entries of the cross connect that correspond to those of the plurality of sub-channels allocated to the optical network protocol process, and
the mesh protection process to modify entries in the cross connect that correspond to those of the plurality of sub-channels allocated to a set of one or more non-preemptable unprotected traffic (NUT) channels, wherein the mesh protection process modifies cross connect entries according to routes determined by the mesh protection process.

24. The apparatus of claim 23 wherein the optical network protocol process is a synchronous optical network/synchronous digital hierarchy process.

25. The apparatus of claim 23 wherein the control card comprises a first processor to host the mesh protection process and a second processor to host the optical network protocol process.

26. A machine-readable medium having stored instructions, which when executed by a set of one or more processors, cause said set of processors to perform operations comprising:
protecting a first channel with automatic protection switching, wherein the first channel has been provisioned from a plurality of optical sub-channels;
inhibiting automatic protection switching on a second and third channel, which have been provisioned from the plurality of optical sub-channels, wherein the second and third channels are provisioned as a first and second non-preemptable unprotected (NUT) traffic channels respectively;
transmitting traffic over a first path through an optical network, wherein the first path includes the second channel;
detecting a failure in the first path;
determining with a mesh protection process a second path through the optical network as an alternative to the first path, the second path including the third channel; and
transmitting traffic in the third channel.

27. The machine-readable medium of claim 26 wherein the mesh protection process implements quality of service in the optical network.

28. The machine-readable medium of claim 26 wherein the second path is calculated by the mesh protection process in response to detecting the failure in the first path.

29. The machine-readable medium of claim 26 wherein the second path is predetermined.

30. The machine-readable medium of claim 26 wherein the traffic is data traffic.

31. The machine-readable medium of claim 26 wherein the traffic is voice traffic.

32. The machine-readable medium of claim 26 further comprising communicating the failure throughout the optical network in-band.

33. The machine-readable medium of claim 26 further comprising communicating the failure throughout the optical network out-of-band.

34. The machine-readable medium of claim 26 further comprising communicating the failure throughout the optical network via a separate network.

35. A machine-readable medium having stored instructions, which when executed by a set of one or more processors, cause said set of processors to perform operations comprising:
protecting a first set of one or more optical sub-channels with automatic protection switching;
utilizing a second and third set of one or more optical sub-channels to transmit traffic in accordance with a mesh process to transmit traffic, wherein the second and third set of optical sub-channels are provisioned as a first and second non-preemptable unprotected (NUT) traffic channels respectively; and
transmitting traffic in the third set of optical sub-channels, which would have been transmitted in the second set of optical sub-channels, in accordance with routes determined by the mesh process in response to an alarm indicating a failure affecting the second set of optical sub-channels.

36. The machine-readable medium of claim 35 wherein the mesh protection process implements quality of service in the optical network.

37. The machine-readable medium of claim 35 wherein the mesh process statically or dynamically determines the routes.

38. The machine-readable medium of claim 35 further comprising communicating the alarm throughout the optical network in-band.

39. The machine-readable medium of claim 35 further comprising communicating the alarm throughout the optical network out-of-band.

40. The machine-readable medium of claim 35 further comprising communicating the alarm throughout the optical network via a separate network.

* * * * *